Jan. 10, 1933.   F. M. POOLE   1,893,635
HEATER CONTROL SYSTEM
Filed Sept. 18, 1929
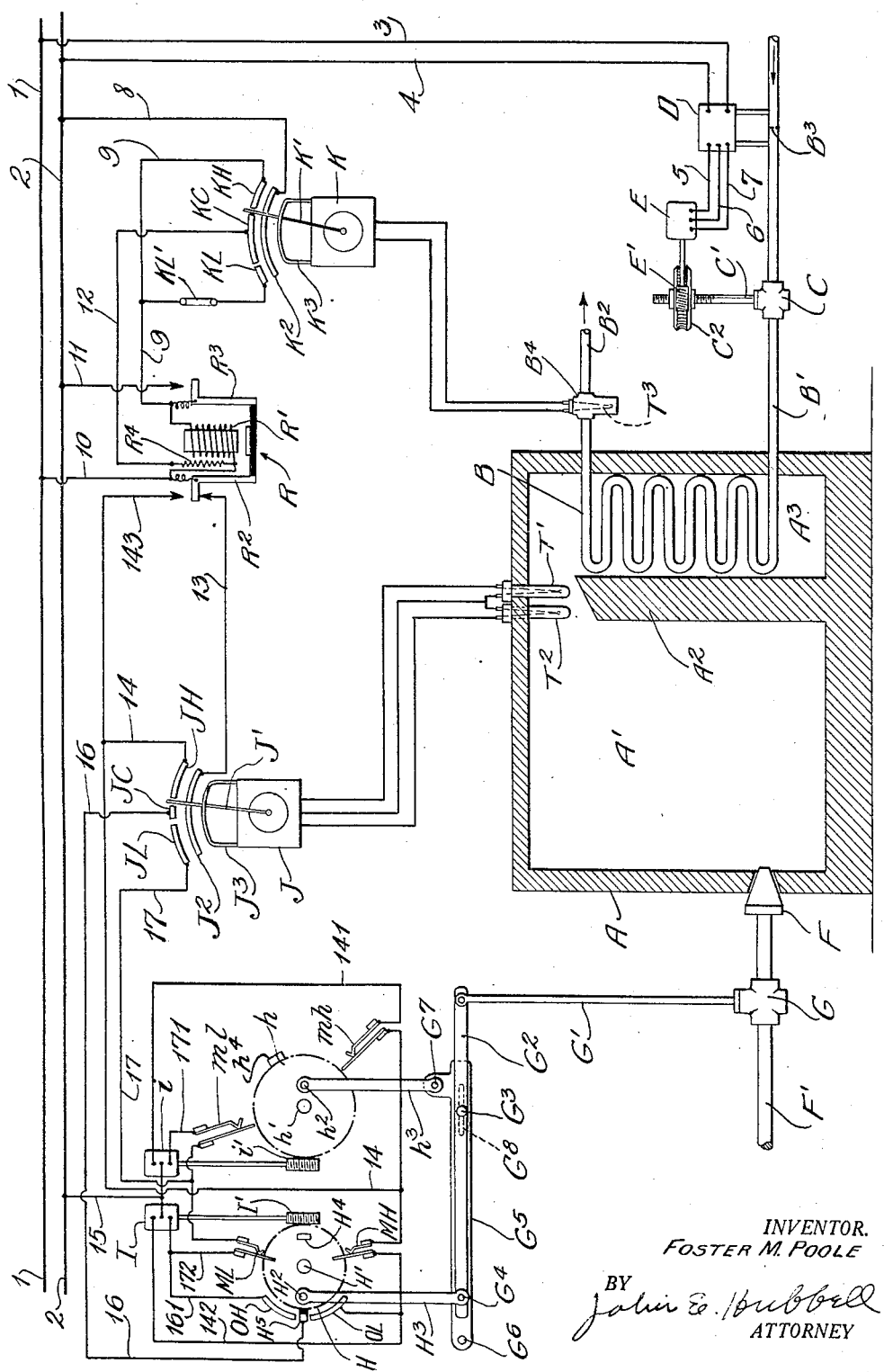
INVENTOR.
FOSTER M. POOLE
BY
ATTORNEY Patented Jan. 10, 1933

1,893,635

UNITED STATES PATENT OFFICE

FOSTER MALIC POOLE, OF KANSAS CITY, MISSOURI, ASSIGNOR TO THE BROWN INSTRUMENT COMPANY, OF PHILADELPHIA, PENNSYLVANIA, A CORPORATION OF PENNSYLVANIA

HEATER CONTROL SYSTEM

Application filed September 18, 1929. Serial No. 393,392.

The general object of the present invention is to provide improved methods of and apparatus for control primarily devised for use in controlling the operation of a so-called tube still or oil heater employed in heating petroleum oils to a refining temperature, though the invention is not necessarily restricted to that specific use. A more specific object of the invention is to provide a simple and effective method of and means for normally regulating the heat supply to an oil heater or the like in such manner as to maintain the heater temperature at a constant value, normally effective to produce the desired heating effect, and for interrupting or reducing the supply of heat to the heater, regardless of the heater temperature, whenever the temperature to which the oil is heated, or other heating result produced, exceeds a desired value. A desirable characteristic of the present invention is that it may be carried out by the use of temperature measuring and control instruments, relays, valve actuating motors, and the like, of commercial form without requiring any, or at least, any significant modification thereof, to permit their interconnection and interrelation as required for the purposes of the present invention.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter, in which I have diagrammatically illustrated and described a preferred embodiment of the present invention.

The one figure of the drawing is a diagrammatic representation of an oil heater and its control system.

In the drawing, I have illustrated the use of the present invention in connection with a diagrammatically illustrated oil heater or tube still A of conventional type, comprising a combustion chamber A', separated by a bridge wall $A^2$ over which the heating gases pass, from a chamber $A^3$, in which all, or a considerable portion of the heat generated in the combustion chamber is absorbed by a bank of tubes B, through which the oil heated is passed. Oil is supplied to the tubes B through an inlet pipe B', receiving oil from a pump (not shown), or other source of oil under pressure, at a rate controlled by a regulating valve C. The oil heated in the tubes B passes away from the tubes through the outlet pipe $B^2$. As shown, the heater A is heated by the combustion of oil or other fluid fuel supplied to a burner F through a fuel supply pipe F', at a rate dependent upon the adjustment of a regulating valve G.

In the contemplated operation of the particular form of apparatus shown in the drawing, the valve C is automatically adjusted as required to maintain a constant rate of oil flow through the tubes B, and the valve G is normally adjusted automatically by control means including a control instrument and thermo-couples T' and $T^2$, as required to maintain a constant temperature in the oil heater in the portion of the heating gas path through the heater above the bridge wall $A^2$, the thermocouples T' and $T^2$ being exposed to the temperature in said gas path portion. With the oil flow through the heater and the heater temperature regulated as described, the oil delivery temperature should be normally maintained at an approximately constant value. From time to time, however, as a result of weather changes, or because of disturbance in the oil feed pump or like causes, there is a variation of the rate of heat supply to heat requirement required to maintain the exit oil temperature desired. Such changes in said rate as tend to reduce the exit oil temperature, or to slightly and gradually increase the exit oil temperature, may readily be compensated for by the manual adjustment of the control mechanism so as to change the rate of oil feed or the heater temperature maintained.

Occasionally, however, the operation of the apparatus already described may result in a relatively rapid increase in the exit oil temperature with consequent objectionable overheating of the oil and disturbance in the oil refining process. To insure against any objectionable rise in the oil temperature, I have provided in the apparatus shown in the drawing, means shown as including a thermocouple $T^3$, a control instrument K and cooperating instrumentalities through which the instrument K operates to quickly and substantially reduce the fuel supply to the burner F whenever the oil delivery temperature rises above a predetermined value without regard of what the temperature above the furnace bridge wall may then be.

As shown, the valve C is automatically adjusted as required to maintain a constant oil feed under normal operating conditions, by means including a flow measuring instrument D connected to the conduit B' at opposite sides of an orifice $B^3$ therein, so as to respond to a pressure differential which is a function of the rate of flow through the conduit B'. The instrument D includes means for operatively connecting one or another pair of the terminals 5, 6 and 7 of the reversible motor E to branch conductors 3 and 4 from current supply conductors 1 and 2, so that the motor E will run in one direction and adjust the valve C in the closing direction when the oil feed rises above the normal rate, and will run in the opposite direction and give valve C an opening adjustment when the oil feed diminishes below the normal or predetermined rate. The manner in which the instrument D performs its intended purposes, need not be illustrated or described herein, as such instruments are well known, and the particular form of the instrument D constitutes no part of the present invention. As diagrammatically and conventionally shown, the shaft of the motor E carries a worm E' in mesh, with a worm wheel $C^2$ forming a rotatable nut, through which the threaded stem C' of the valve C passes, so that when the worm wheel $C^2$ is rotated the stem C' is moved out or into the casing of the valve C according to the direction in which the worm wheel $C^2$ is rotated.

The mechanism shown for adjusting the valve G comprises a floating lever $G^2$ pivotally connected at one end to the valve stem G'. At its opposite end, the lever $G^2$ is connected by a link $H^3$ to a crank pin $H^2$ carried by a crank disk H mounted on a shaft H'. Intermediate its ends, the lever $G^2$ is pivotally mounted on a fulcrum pin $G^3$. The latter is carried by a lever $G^5$ pivoted to turn about the stationary fulcrum pin $G^6$, and pivotally connected at $G^7$ to a link $h^3$, by which the lever $G^5$ is connected to a crank pin $h^2$ carried by the crank disk h mounted on a shaft h'. As shown, the fulcrum pin $G^3$ is adjustably mounted in a slot $G^8$ extending longitudinally of the lever $G^5$ to permit adjustment of the effects of given disk movements on the position of the valve stem G'. With the arrangement described, a rotation in the clockwise direction of either disk H or h gives a valve closing adjustment to the valve stem G', and a rotation of either disk in the counterclockwise direction gives the valve G an opening adjustment. The normal angular movement of each of the disks is within a range somewhat less than 180°, the limits of the disk movements being fixed as hereinafter explained by engagements of projections $H^4$ and $h^4$ carried by the disks H and h respectively with corresponding limit switches which, as hereinafter described, interrupt the energization of the motors effecting the disk movements.

The crank disk H is given its rotative movements by a reversible relay motor I diagrammatically shown as operatively connected to the disk H by a worm I' carried by the motor shaft and in mesh with worm gear teeth provided at the periphery of the disk H. The disk h is similarly geared to and operated by a reversible relay motor i, the shaft of which carries a worm i' in mesh with worm gear teeth formed on the periphery of the disk h.

The energization of the motor H for operation in either direction produces a substantial adjustment of the valve stem G' in a relatively short period of time, whereas the energization of the motor h during a similarly short period of time produces a relatively small adjustment of the stem G' of the valve G. This difference in the operative effects of the motors H and h may be obtained as indicated in the drawing, by making the diameter of the disk H smaller than the diameter of the disk h and by locating the crank pin $H^2$ at a greater distance from the shaft H' than separating the crank pin $h^2$ and shaft h', and by making the pitch of the worm I' coarser than the pitch of the worm i'. As those skilled in the art will understand, however, it will ordinarily be desirable in practice to provide speed reducing gear connections between the relay motor shafts and the crank disks H and h driven by them which are capable of a greater speed reduction than the simple worm and worm gear connections diagrammatically shown in the drawing. With whatever forms of gear connection may be employed the parts may well be proportioned and arranged so that the full valve adjustment obtainable by the operation of the relay motor I may be obtained in a fraction of a minute while the full valve adjustment obtainable by the operation of the motor i may require several minutes.

In normal operation, the energization of the motors I and i for operation in either direction, is controlled by the instrument J. The latter is a measuring instrument with control provisions, and in practice, may advantageously be an instrument of well known type including provisions for separately and successively measuring and recording the temperatures to which the two thermocouples T' and T² separately respond, and the average temperature indicated by the sum of voltages of the two thermocouples, and for periodically exerting control effects. As diagrammatically illustrated, the instrument J comprises a galvanometer, the pointer J' of which deflects in response to the temperature indication collectively indicated by the two thermocouples T' and T² when connected in series to the galvanometer. As those skilled in the art will understand, two thermocouples T' and T², located at different points along the length of the bridge wall A², are advantageously employed collectively for control purposes, because they give an average temperature condition which is a better measure of the control effect required than would be afforded by either thermocouple used alone.

The pointer J' serves to connect a control contact J² to one or another of control contacts JH, JC and JL, according to the deflection of the pointer J', whenever the latter is periodically depressed by the usual intermittently operated depressor J³ of the instrument J.

In normal operation, whenever the average temperatures collectively indicated by the sum of the voltages of the thermocouples T' and T², rise above a certain predetermined value fixed by the position of the contact JH, the pointer J', when thereafter depressed, connects the contact J² and the contact JH and thereby closes energizing circuits for the motors I and i, causing each motor to turn in a direction giving a closing adjustment to the valve G. The energizing circuit for the motor i thus closed comprises the supply conductor 1, branch conductor 10, relay contact R², conductor 13, contact J², contact JH, conductor 14, limit switch mh, conductor 141 connecting switch mh to one terminal of the motor i, and conductor 15 connecting a second terminal of the motor i to the supply conductor 2. The energizing circuit for the motor I established when the motor i is energized as just described, comprises the conductor 14 and its above mentioned connections to the supply conductor 1, the limit switch MH to which the conductor 14 is also connected, the conductor 142 connecting the switch MH to one terminal of the motor I, and the conductor 15, which is connected to one terminal of the motor I as well as to one terminal of the motor i.

In normal operation, when the pointer J' first engages the contact JH, the disk H will be in its intermediate position shown in the drawing, and the resultant energization of the motor I then moves the disk H from its intermediate position into the position in which the part H⁴ of the disk H engages and opens the limit switch MH, and thereby stops the motor I, this movement of the disk H occurring during the period in which the pointer J' is held in engagement with the contact JH on a single actuation of the depressor J³. Owing to the previously mentioned differences between the connections of the motor I to the disk h, and the connections of the motor i to the disk H, the operation of the motor i, produced by a single actuation of the depressor J³ effects only a small fraction of the entire valve closing adjustment which can normally be produced by the motor I. In consequence, succeeding actuations of the depressor J³ operatively connecting the contacts J² and JH result in further valve closing adjustments, which normally are repeated until the furnace temperature is so reduced that the pointer J' is no longer above the contact JH, or in any event, until the adjustments of the disk h in the valve closing direction causes the part h⁴ to engage and open the limit switch mh, and thereby interrupts the energization of the motor i.

When, following the operations just described and the resultant drop in furnace temperature, the pointer J' is depressed into engagement with the contact JC, the pointer then connects the contacts J² and JC. This does not bring the motor i into operation, but closes an energizing circuit for the motor I, which is thereby actuated to return the crank disk H into the intermediate position shown in the drawing. The last mentioned energizing circuit comprises the supply conductor 1, branch conductor 10, relay contact R², conductor 13, contact J², contact JC, conductor 16, a contact H⁵ carried by the disk H, a contact OH, a conductor 161 connecting the contact OH to the third terminal of the motor I, conductor 15, and supply conductor 2. The effect of thus returning the crank disk H to its intermediate position with the substantial opening adjustment thereby imparted to the valve G, tends to check the decrease in furnace temperature which resulted in the adjustment, and thus tends to eliminate hunting. The contact OH is a stationary arc shaped contact engaged by the contact H⁵ in any position of the disk H into which the latter may move in the clockwise direction from the intermediate position shown in the drawing. A similar contact OL is engaged by the contact H⁵ in any position of the disk H into which the latter may be moved in the counterclockwise direction from the intermediate position shown in the drawing.

No further valve adjustments are effected by the instruments J so long as the pointer J' remains above the contact JC. If the pointer J' again moves into position above the contact JH, the previously described valve adjusting operations are repeated. If the furnace temperature falls sufficiently to move the pointer J' into a position above the contact JL, another set of valve adjusting operations, tending to restore the temperature to its normal value, are effected.

The valve adjusting operations effected when the pointer J' connects the contacts J² and JL, are generally similar to those produced when the contacts J² and JH are connected, except that they are in the reverse direction. On the first operative connection of the contacts J² and JL after the pointer J' moves above the latter, both motors I and $i$ are energized to rotate the crank disks each in the counter-clockwise direction. The energizing circuit for the motor $i$ then completed comprises supply conductor 1, branch conductor 10, relay contact R², contact 13, contact J², contact JL, conductor 17, limit switch $ml$, conductor 171 connecting the switch $ml$ to the third terminal of the motor $i$, conductor 15, and supply conductor 2. The energizing circuit simultaneously closed for the motor I includes the conductor 17 and its connections to the supply conductor 2, the limit switch ML, and the conductors 172 and 161 connecting switch ML to one terminal of the motor I, the conductor 15, and supply conductor 2. When thus energized, the motor $i$ gives a small valve opening movement to the disk $h$ and the motor I moves the disk H from its intermediate position into the position in which it opens the limit switch ML. Thereafter, so long as the pointer J' remains above the contact JL, no further adjustment of the motor H can occur in normal operation, but the valve opening adjustments effected by the motor $i$ are repeated whenever the depressor J³ operatively connects contacts J² and JL until the furnace temperature rises sufficiently to move the pointer J' out of its position above the contact JL, or until the disk $h$ is adjusted into the position in which the limit switch $ml$ is opened when the pointer J' thereafter moves again into position above the contact JC and is depressed to connect the latter to the contact J², the motor I is operated to return the disk H to its intermediate position. The energizing circuit closed to thus actuate the motor I includes the contact H⁵ and the previously described connections between it and the supply conductor, and also includes the contact OL, the conductor 142 through which that contact is connected to a terminal of the motor I, and the conductor 15 connecting another terminal of the motor I to the supply conductor 2.

As previously indicated, the valve adjustments effected under the control of the instrument J as above described, are those which occur under the normal operating conditions in which the exit oil temperature does not exceed a predetermined value. When the exit oil temperature rises above a predetermined value, the control instrument K assumes control of the motors I and $i$. While exercising its control functions the instrument K prevents the instrument J from exercising any control function dependent upon furnace temperature, and effects adjustments of the valve G tending to quickly reduce the exit oil temperature. The control instrument K may be similar to the control instrument J and as diagrammatically shown comprises parts K', K², K³, KL, KC and KH, corresponding respectively, to the parts J', J², J³, JL, JC and JH of the instrument J. So long as the exit oil temperature to which the thermocouple T³ responds is within a normal range, the pointer K' will be above the contact KC, and its periodical engagement with that contact effected by the depressor K³ will be idle and without effect upon the control mechanism. On an increase in the exit oil temperature resulting in the operative connection of the contacts K² and KH by the pointer K' an energizing circuit for a relay R is closed, and the energization of that relay results in operations of the motors I and $i$ effecting valve closing adjustments, regardless of the furnace temperature condition to which the control instrument J is then responding.

The relay R may be, and as diagrammatically illustrated, is of a conventional and well known type comprising an energizing coil R', which, when energized, moves the relay contact R² out of engagement with the conductor 13 and into engagement with the conductor 143. When the pointer K' operatively connects contacts K² and KH, it closes an energizing circuit for the relay R, comprising supply conductor 2, branch conductor 8, contact K², contact KH, conductor 9, relay energizing coil R', branch conductor 10, and supply conductor 1. The resultant relay actuation brings another relay contact R³ into engagement with the branch conductor 11, and thereby closes a holding-in circuit for the relay R which maintains the energization of the latter after the subsequent rising movement of the depressor K³, permits the pointer K' to move out of engagement with the contacts K² and KH. This holding-in circuit comprises the supply conductor 2, conductor 11, contact R³, coil R', conductor 10, and supply conductor 1.

The movement of the contact R² out of engagement with the conductor 13 when the relay R is energized, deenergizes the contact J² of the instrument J, and thereby prevents the latter from exercising any control function until the contact R² again engages the conductor 13 and energizes the contact J². The conductor 143 is connected at one end to the conductor 14, and when the energization of the relay R brings the contact R² into engagement with the conductor 143, the conductor 14 is thereby connected by conductor 143, contact R² and branch conductor 10 to the supply conductor 1. The connection of the conductor 14 to the supply conductor 1 effects the energization of the motors I and I' in the manner previously described to start each of the latter into operation in the direction to give valve closing movements to the disks H and h. The movement of the motor i, as well as of the motor I when thus energized, continues without interruption until its full valve closing adjustment is effected, and the limit switches MH and mh are both closed, unless in the meantime, a reduction in the exit oil temperature results in a de-energization of the relay R.

When, following the energization of the relay R, a reduction in the exit oil temperature brings the pointer K' of the instrument K into the position in which it operatively connects the contacts $K^2$ and KC, a low resistance shunt is closed about the coil R', and the relay R is thereby deenergized. This low resistance shunt is formed by a conductor 12 including a current limiting resistance $R^4$, which connects one terminal of the winding R' to the contact KC, the latter, the contact $K^2$, the conductor 8, a section of the supply conductor 12, the branch conductor 11, and the relay contact $R^3$ which connect to the second terminal of the winding R'. The deenergization of the relay R restores the normal condition in which the contact $J^2$ is energized and the motors I and i are subject to the control of the instrument J.

The contact KL of the instrument K is a safety device enabling the instrument K to prevent the instrument J from exercising a control function, and to shut off the supply of fuel to the oil heater in case of a break in the thermocouple $T^3$ and the resultant movement of the pointer K' into a position which would correspond to an abnormally low exit oil temperature. When, in consequence of a break in the thermocouple $T^3$, the pointer K' operatively connects the contacts $K^2$ and KL, the energizing circuit for the relay R is completed by the connection then established through the contact KL between the conductor 9 and the supply conductor 2. The effect of this energization of the relay R is the same as that previously described as resulting on the connection of the contacts KH and $K^2$. To prevent the operation of the instrument K through the conductor KL from interfering with the operation of starting the oil heater into operation, a switch KL' may advantageously be provided for temporarily disconnecting contact KL from the conductor 9.

As previously indicated the present invention is desirably characterized by the fact that measuring and control instrument and associated parts employed in the practice of the invention, may well be of existing commercial types with little or no change therein, except as such change may be required in the disposition of the control contacts forming parts of the instruments J and K. Advantageously, the intermediate contact KC of the instrument K is of greater length than control contacts usually provided in such control instruments. In practice in the use of the present invention for controlling an oil heating furnace, the contacts C may advantageously be of such length, and the contacts KL and KH so disposed, that the pointer K will engage the contact KH only when the exit oil temperature exceeds the normal maximum value of such temperature by 20° or so, and will engage the contact KL only when the exit oil temperature falls 100° or so below its normal maximum value.

A further advantage of the invention is found in the fact that the changes in operating conditions resulting in the transfer of the control of the furnace fuel supply regulating mechanism from one of the instruments J and K to the other does not interfere with the measuring operation of either instrument. Each of said instruments continuously exercise its measuring functions in normal operation and the accuracy of the measurements obtained with each instrument does not depend whether the instrument is or is not exercising its control functions.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:—

1. In a control system, a meter comprising a member deflecting in response to changes in the value of a source of energy and control devices selectively actuated by said member according to its deflection, a second meter comprising a member deflecting in response to changes in value of a second source of energy and control devices selectively actuated by the last mentioned member according to its deflection, regulating mechanism controlling one of said sources of energy, means through which said mechanism is normally controlled by the selective actuation of the control devices of the first mentioned meter, and means through which the first mentioned meter is prevented from controlling said mechanism and the latter is subjected to a control action whenever one of the control devices of said second meter is actuated, and means through which the actuation of another control device of said second meter restores the control of said mechanism to the first mentioned meter.

2. In a control system, a meter comprising a member deflecting in response to changes in the value of a source of energy and control devices selectively actuated by said member according to its deflection, a second meter comprising a member deflecting in response to changes in value of a second source of energy, and high, low and intermediate control devices selectively actuated by the last mentioned member according to its deflection, regulating mechanism controlling one of said sources of energy, means through which said mechanism is normally controlled by the selective actuation of the control devices of the first mentioned meter, and means controlled by the second meter through which the first mentioned meter is prevented from controlling said mechanism whenever either the high or low control devices of said second meter is actuated and means through which the actuation of the intermediate device of said second meter restores the control of said mechanism to the first mentioned meter.

3. The combination with heating apparatus comprising a heater and means for varying the heat supply thereto, of a measuring and control instrument continuously measuring a heater temperature, a second measuring and control instrument continuously measuring a heater effect, means through which the first mentioned instrument normally controls the first mentioned means to thereby maintain an approximately constant heater temperature, and other control means through which, whenever a predetermined departure of said effect from a normal value thereof occurs, said second instrument interrupts the control by the first mentioned meter of the first mentioned means and subjects the latter to a regulating effect tending to reduce the heater temperature.

4. The combination with heating apparatus comprising a heater normally operating continuously at an approximately constant temperature to produce an approximately constant heating effect and means for varying the heat supply thereto, of a measuring and control instrument continuously measuring a heater temperature, a second measuring and control instrument continuously measuring said heater effect, means through which the first mentioned instrument normally controls the first mentioned means to thereby maintain an approximately constant heater temperature, and other control means through which said second meter interrupts and restores the control of the first mentioned means by the first mentioned instrument whenever said effect departs from and returns to a predetermined normal value.

5. Fluid heating apparatus comprising in combination a tubular fluid heater, means for passing fluid through the tubes of said heater at a predetermined rate, heater regulating means adjusting the rate of heat supply to the heater, means for continuously measuring the heater temperature, means for continuously measuring the exit fluid temperature, control means through which the heater temperature measuring means normally controls said regulator so as to maintain an approximately constant heater temperature, and means through which the fluid temperature measuring means render said control means inoperative or operative accordingly as said fluid temperature departs from or returns to a predetermined normal value, and actuates said regulating means to reduce the rate of heat supply to the heater whenever said control means is so rendered inoperative.

6. Fluid heating apparatus comprising in combination a tubular fluid heater, means for passing fluid through the tubes of said heater at a predetermined rate, regulating means adjusting the rate of heat supply to the heater, means for continuously measuring the heater temperature, means for continuously measuring the exit fluid temperature, control means through which the heater temperature measuring means normally controls said regulator so as to maintain an approximately constant heater temperature, and means through which the fluid temperature measuring means renders said control means inoperative and operates said regulating means to diminish the furnace temperature whenever said fluid temperature measuring means indicates a fluid temperature departing from a normal value to a predetermined extent in either direction.

7. Fluid heating apparatus comprising in combination a tubular fluid heater, means for passing fluid through the tubes of said heater at a predetermined rate, regulating means adjusting the rate of heat supply to the heater, means for continuously measuring the heater temperature, means for continuously measuring the exit of fluid temperature, control means through which the heater temperature measuring means normally controls said regulator so as to maintain an approximately constant heater temperature, and means through which the fluid temperature measuring means renders said control means inoperative and operates said regulating means to diminish the heater temperature whenever said fluid temperature rises above a predetermined normal value.

8. The combination with heating apparatus and means for varying the heat supply thereto, of a measuring and control instrument continuously measuring a heater temperature and comprising a deflecting element and control contacts selectively actuated by said element in accordance with the deflection of said element, a relay adjustable from one condition into another, connections between said means, relay and contacts through which the adjustment of said relay into one condition operates said means to diminish the heat supply to the heater and through which the adjustment of the relay into its other condition permits said element to effect an increase or decrease in the heat supply to the heater accordingly as said element actuates one or another of said contacts, a second measuring and control instrument continuously measuring a heater effect and comprising a deflecting element and control contacts selectively actuated by said element in accordance with the deflection of the last mentioned element, and connections between said relay and the last mentioned contacts through which said relay is adjusted from said one condition to said other condition by the last mentioned element accordingly as it actuates one or another of the last mentioned contacts.

9. Oil heating apparatus comprising in combination a tubular oil heater, means for passing oil through the tubes of said heater at a predetermined rate, a measuring means continuously measuring the furnace temperature, a second measuring means continuously measuring the temperature at which oil is heated in passing through the heater, control means through which one of said measuring means normally controls said regulator so as to maintain the temperature measured by the last mentioned measuring means at an approximately constant value, and means through which the other measuring means renders said control means inoperative and operates said regulating means to diminish the heat supply to the furnace whenever the temperature measured by the last mentioned measuring means rises above a predetermined normal value.

10. An automatic control for heat transfer systems having a first control instrument responsive to a temperature characteristic of the heat supply, a second control instrument responsive to a temperature characteristic of the material being heated, heat supply adjusting means, and means combining the control instruments and the adjusting means for effecting the operation of the adjusting means by the first control instrument alone so long as the second control instrument be subjected to a predetermined temperature range and for effecting the operation of the adjusting means by the second control instrument alone so long as it is subjected to a temperature different from said predetermined temperature range.

11. The combination with heating apparatus comprising a heater and means for varying the heat supply thereto, of a measuring and control instrument measuring a heater temperature, a second measuring and control instrument measuring a work temperature, control means through which one of said instruments normally controls the first mentioned means to increase the heat supply to the heater more or less whenever the temperature measured by the last mentioned instrument exceeds its normal value for a greater or lesser period of time, and diminishing the heat supply to the heater more or less whenever the last mentioned temperature is below said normal value for a greater or less period of time, and other control means through which the other of said instruments acts whenever the temperature measured by the last mentioned instrument exceeds a predetermined value, to render said one instrument inoperative to control the first mentioned means, and to adjust the latter to reduce the heat supply to the heater, and which again renders said one instrument operative to control the first mentioned means whenever the last mentioned temperature falls to or below said predetermined value.

Signed at Kansas City, in the county of Jackson and State of Missouri, this 13th day of September A. D., 1929.

FOSTER MALIC POOLE.